(12) United States Patent
Averhart et al.

(10) Patent No.: US 10,488,868 B2
(45) Date of Patent: Nov. 26, 2019

(54) DYNAMIC FEATURE AVAILABILITY MAPPING FOR A VEHICLE

(71) Applicant: GM GLOBAL TECHNOLOGY OPERATIONS LLC, Detroit, MI (US)

(72) Inventors: Andrew W. Averhart, Redford, MI (US); Ismail Hamieh, Dearborn, MI (US); Clark Zimmerman, Clinton Township, MI (US); Brittany M. Smith, Livonia, MI (US); Michael P. Marchione, New Baltimore, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/913,364

(22) Filed: Mar. 6, 2018

(65) Prior Publication Data

US 2019/0278297 A1 Sep. 12, 2019

(51) Int. Cl.
*G05D 1/02* (2006.01)
*G01C 21/34* (2006.01)
(Continued)

(52) U.S. Cl.
CPC ........ *G05D 1/0278* (2013.01); *G01C 21/3453* (2013.01); *G01C 21/3679* (2013.01); *G01C 21/3697* (2013.01); *G05D 1/0088* (2013.01); *G05D 1/0274* (2013.01); *G06Q 30/0215* (2013.01); *G01S 19/14* (2013.01); *G06F 16/29* (2019.01)

(58) Field of Classification Search
CPC .. G05D 1/0278; G05D 1/0088; G05D 1/0274; G06Q 30/0215; G06F 16/29; G01C 21/3453; G01C 21/3679; G01S 19/14
See application file for complete search history.

(56) References Cited

U.S. PATENT DOCUMENTS

| 9,805,601 | B1 * | 10/2017 | Fields | G08G 1/096791 |
| 2010/0256852 | A1 * | 10/2010 | Mudalige | G08G 1/163 701/24 |

(Continued)

*Primary Examiner* — Behrang Badii
*Assistant Examiner* — Daniel L Greene
(74) *Attorney, Agent, or Firm* — Reising Ethington P.C.; David Willoughby

(57) ABSTRACT

A system and method of enabling or disabling vehicle features based on vehicle location, wherein the method includes: receiving a localized geographical vehicle feature map at the vehicle from a remote server, wherein the localized geographical vehicle feature map includes geographical vehicle feature map data, wherein the geographical vehicle feature map data includes geographical regions associated with vehicle feature data that indicates whether one or more vehicle features are enabled and/or disabled; monitoring vehicle location; based on the monitoring of the vehicle location, determining that the vehicle is located within or approaching a particular geographical region of the geographical regions included in the localized geographical vehicle feature map; determining at least one vehicle feature associated with the particular geographical region based on accessing the localized geographical vehicle feature map; and enabling and/or disabling the at least one vehicle feature based on information contained within the localized geographical vehicle feature map.

18 Claims, 9 Drawing Sheets

(51) Int. Cl.
*G01C 21/36* (2006.01)
*G06Q 30/02* (2012.01)
*G05D 1/00* (2006.01)
*G01S 19/14* (2010.01)
*G06F 16/29* (2019.01)

(56) References Cited

U.S. PATENT DOCUMENTS

| | | | |
|---|---|---|---|
| 2014/0278038 A1* | 9/2014 | Stankoulov | G01C 21/3469 701/123 |
| 2015/0274156 A1* | 10/2015 | Phillips | B60W 10/06 701/22 |
| 2018/0244263 A1* | 8/2018 | Bower | B60W 20/40 |
| 2018/0334170 A1* | 11/2018 | Liu | B60W 30/192 |

* cited by examiner

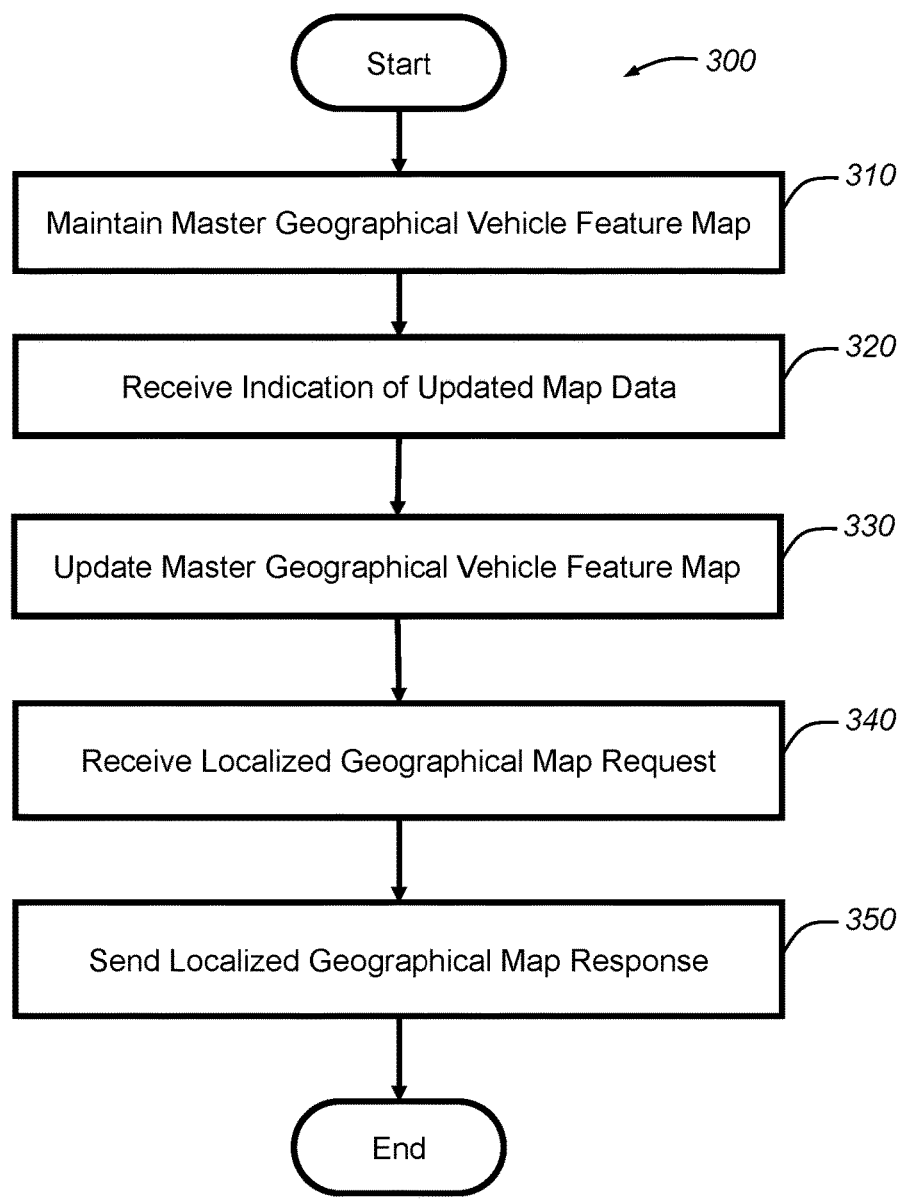

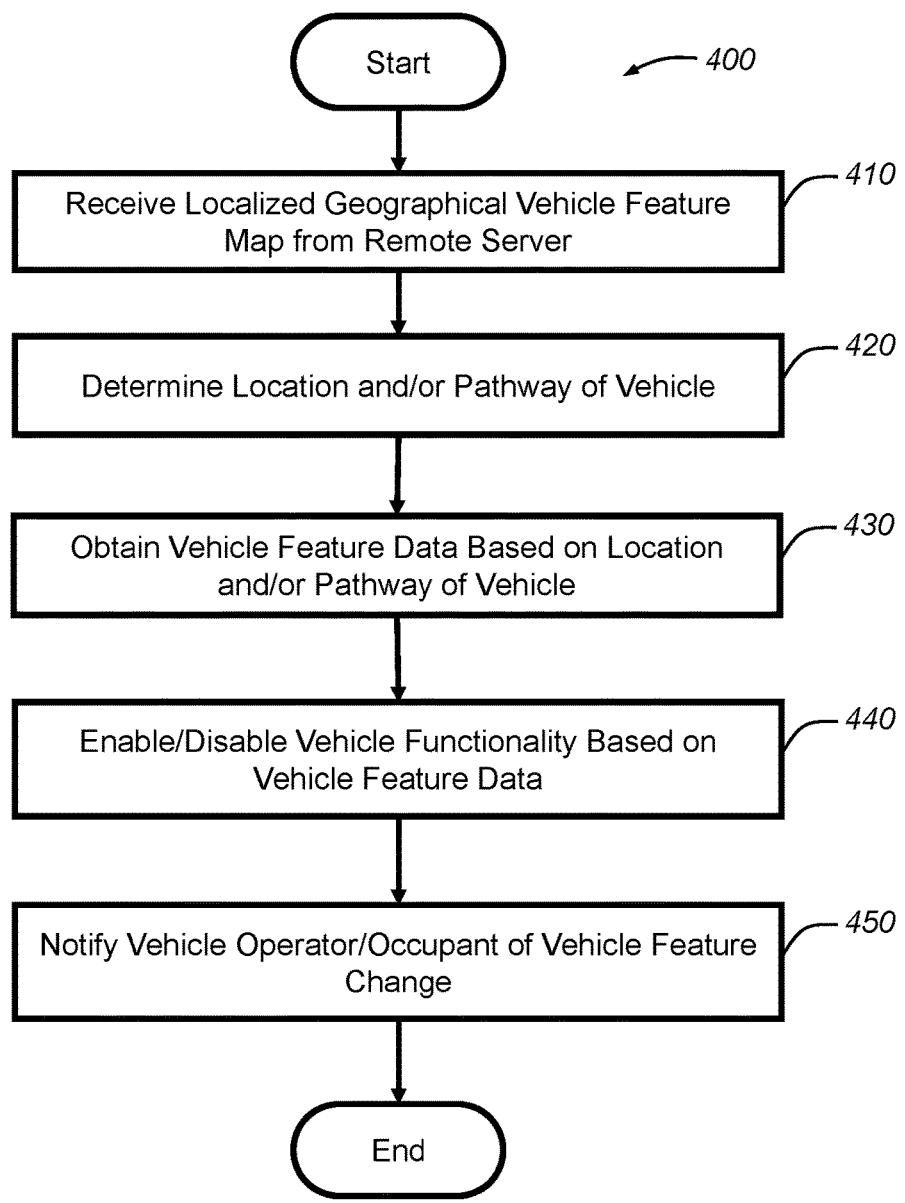

DYNAMIC FEATURE AVAILABILITY MAPPING FOR A VEHICLE

INTRODUCTION

The present invention relates to providing geographical map data to a vehicle.

Vehicles include hardware and software capable of obtaining and processing various information, including information that is obtained by vehicle system modules (VSMs). One such VSM is a global navigation satellite system (GNSS) receiver that can obtain or determine geographical coordinates of the vehicle. The geographical coordinates representing the vehicle's location can be used for carrying out autonomous or semi-autonomous operations of the vehicle.

SUMMARY

According to one aspect of the invention, there is provided a method of enabling or disabling vehicle features based on vehicle location, wherein the method includes: receiving a localized geographical vehicle feature map at the vehicle from a remote server, wherein the localized geographical vehicle feature map includes geographical vehicle feature map data, wherein the geographical vehicle feature map data includes geographical regions associated with vehicle feature data that indicates whether one or more vehicle features are enabled and/or disabled, and wherein association of a particular geographical region with particular vehicle feature data indicates that the one or more vehicle features indicated by the particular vehicle feature data are enabled and/or disabled for the particular geographical region; monitoring vehicle location using a global navigation satellite system (GNSS) receiver included in the vehicle that is configured to receive a plurality of GNSS signals from a constellation of GNSS satellites; based on the monitoring of the vehicle location, determining that the vehicle is located within or approaching the particular geographical region of the geographical regions included in the localized geographical vehicle feature map; determining at least one vehicle feature associated with the particular geographical region based on accessing the localized geographical vehicle feature map; and enabling and/or disabling the at least one vehicle feature based on information contained within the localized geographical vehicle feature map.

According to various embodiments, this method may further include any one of the following features or any technically-feasible combination of some or all of these features:
- the geographical regions are each defined by one or more geographical coordinate pairs;
- the enabling and/or disabling step further includes altering performance of a vehicle function that is presently being carried out by the vehicle;
- the at least one vehicle feature concerns autonomous or semi-autonomous vehicle propulsion and/or steering;
- receiving real-time updates of the localized geographical vehicle feature map at the vehicle from the remote server, and updating the vehicle feature data of at least some of the geographical vehicle feature map data based on the real-time updates;
- requesting the real-time updates from the remote server through periodically sending a location associated with the vehicle to the remote server;
- the remote server is configured to store a master geographical vehicle feature map, to update the master geographical vehicle feature map, and to send the updates to the vehicle when the updates correspond to the geographical regions included in the localized geographical vehicle feature map;
- the at least one vehicle feature pertains to a roadway information collection feature that can be used to collect information concerning a roadway or area surrounding the vehicle and to send the collected information to the remote server or another remote server;
- the roadway information collection feature includes using a vehicle camera mapping technology that, when enabled, causes the vehicle to capture images of the roadway on which the vehicle is travelling and, then, send the captured images or data based on the captured images to the remote server or the another remote server;
- the at least one vehicle feature includes an incentivized vehicle operation that credits a vehicle operator or account holder upon completion of the incentivized operation; and/or
- the incentivized operation includes driving the vehicle in a particular lane along the roadway and/or driving the vehicle along a particular route.

According to another aspect of the invention, there is provided a method of enabling or disabling vehicle features based on vehicle location, wherein the method includes: maintaining a master geographical vehicle feature map that includes vehicle feature data associated with geographical regions, wherein the vehicle feature data includes information indicating whether one or more vehicle features are enabled or disabled for a given geographical region that the vehicle feature data is associated with; receiving an indication of an update to geographical roadway data and/or vehicle feature availability; updating the master geographical vehicle feature map based on updated geographical roadway data and/or vehicle feature availability information; and sending localized geographical vehicle feature map information to a vehicle after the updating step.

According to various embodiments, this method may further include any one of the following features or any technically-feasible combination of some or all of these features:
- receiving a localized geographical vehicle feature map request from a vehicle, wherein the localized geographical vehicle feature map request includes or otherwise indicates a vehicle location, wherein the vehicle location is the present location of the vehicle or a location that the vehicle is or intends to be in route towards; and sending a localized geographical vehicle feature map response to the vehicle in response to receiving the request, wherein the response includes information concerning the vehicle location;
- the master geographical vehicle feature map is comprised of geographical roadway information as well as the vehicle feature data that is associated with the geographical regions of the master geographical vehicle feature map;
- receiving roadway information from a plurality of vehicles, wherein at least some of the roadway information is used to update the master geographical vehicle feature map; and/or
- the roadway information is collected pursuant to execution of a roadway information collection application using processing devices included as a part of each of the plurality of vehicles, wherein the roadway information collection application includes using a camera installed on each of the plurality of vehicles to collect information concerning the roadway on which the vehicle is travelling.

According to yet another aspect of the invention, there is provided a vehicle electronics system, including: a global navigation satellite system (GNSS) receiver, wherein the GNSS receiver is configured to receive a plurality of GNSS signals from a constellation of GNSS satellites; a wireless communications device that includes a cellular chipset; and at least one additional vehicle system module (VSM) that is communicatively coupled to the wireless communications device; wherein the vehicle electronics system includes a processor and memory, wherein the memory includes a map-based vehicle feature enablement application, that, when executed by the processor, causes the vehicle electronics system to: receive a localized geographical vehicle feature map at the vehicle from a remote server using the cellular chipset, wherein the localized geographical vehicle feature map includes geographical vehicle feature map data, wherein the geographical vehicle feature map data includes geographical regions associated with vehicle feature data that indicates whether one or more vehicle features are enabled and/or disabled, and wherein association of a particular geographical region with particular vehicle feature data indicates that the one or more vehicle features indicated by the particular vehicle feature data are enabled and/or disabled for the particular geographical region; monitor vehicle location using the global navigation satellite system (GNSS) receiver included in the vehicle; based on the monitoring of the vehicle location, determine that the vehicle is located within or approaching the particular geographical region of the geographical regions included in the localized geographical vehicle feature map; determine at least one vehicle feature associated with the particular geographical region based on accessing the localized geographical vehicle feature map, wherein the at least one vehicle feature is associated with the at least one additional VSM; and enable and/or disable the at least one vehicle feature based on information contained within the localized geographical vehicle feature map.

According to various embodiments, this system may further include any one of the following features or any technically-feasible combination of some or all of these features:
- a camera that is configured to capture images when a roadway information collection feature is enabled;
- the map-based vehicle feature enablement application, when executed, further causes the vehicle electronics system to generate an enable or disable vehicle feature message and to send the enable or disable vehicle feature message to the at least one additional VSM via a communications bus included as a part of the vehicle electronics system; and/or
- the at least one vehicle feature concerns autonomous or semi-autonomous vehicle propulsion and/or steering.

BRIEF DESCRIPTION OF THE DRAWINGS

One or more embodiments of the invention will hereinafter be described in conjunction with the appended drawings, wherein like designations denote like elements, and wherein:

FIG. 6 is a flowchart of an embodiment of a method of enabling or disabling vehicle features based on vehicle location;

FIG. 7 is a flowchart of another embodiment of a method of enabling or disabling vehicle features based on vehicle location.

DETAILED DESCRIPTION

Figure 1:
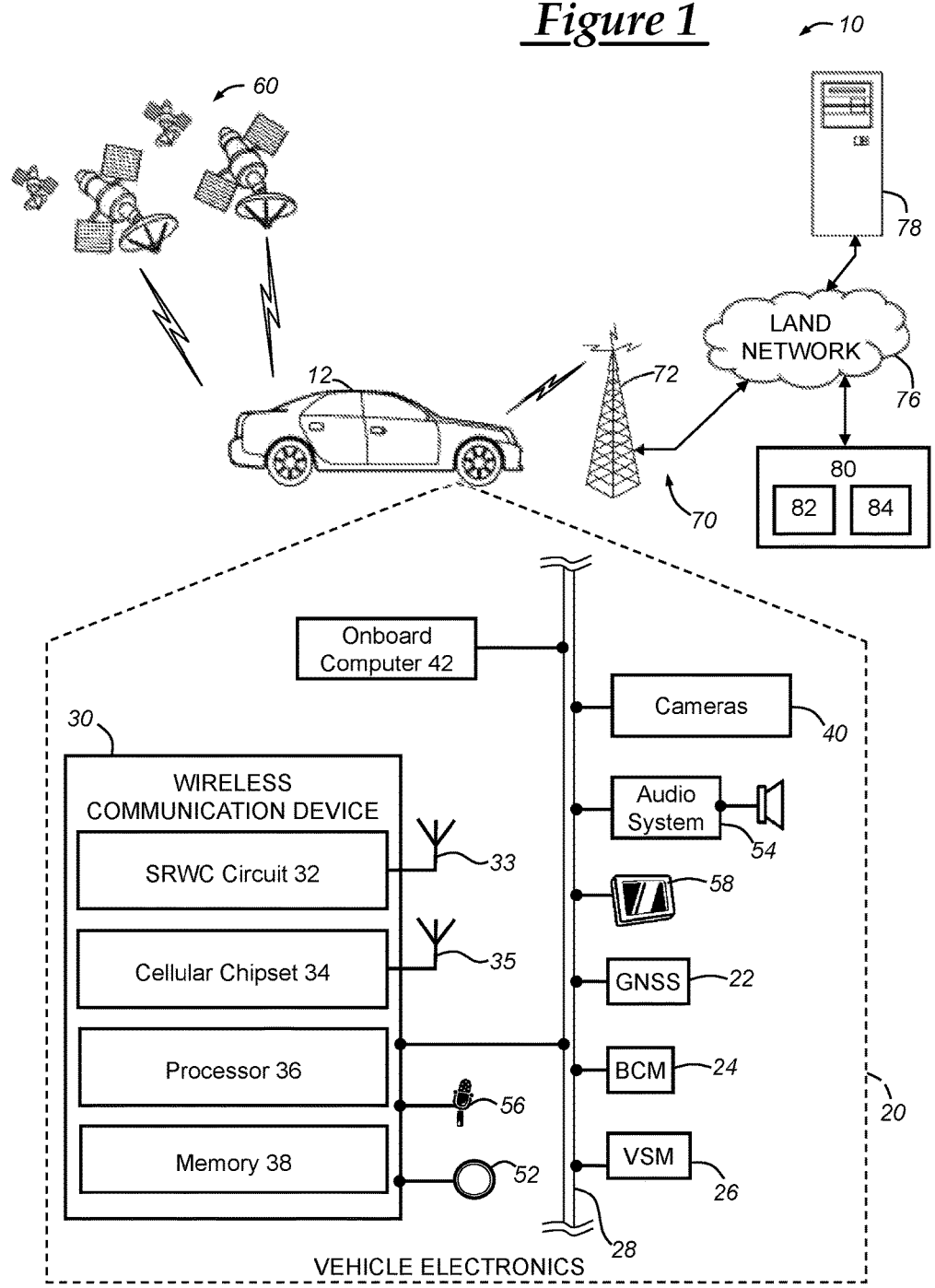
FIG. 1 is a block diagram depicting an embodiment of a communications system that is capable of utilizing the method disclosed herein.

The system and method described below enables a vehicle to enable and/or disable certain vehicle features (or vehicle functionality) based on a geographical location of the vehicle through use of a geographical vehicle feature map that includes geographical regions associated with particular vehicle features. Many vehicles include navigational systems that can be used to provide navigational information to a vehicle occupant and/or to carry out autonomous and/or semi-autonomous vehicle functionality. Navigational information can include geographical and/or roadway maps that provide the vehicle with information regarding the area and/or roadways on which the vehicle is travelling. This geographical and/or roadway map data can be used by the vehicle to carry out semi-autonomous and/or fully autonomous vehicle operations.

However, geographical and/or roadway conditions or features may change over time due to construction of new roadways, implementation of new roadway features, and/or various other reasons. These changes in geographical and/or roadway conditions or features may affect the availability of certain vehicle features in certain areas. For example, a particular vehicle module may include a semi-autonomous cruise control feature that is configured to function when the vehicle is travelling along a highway or an interstate. However, when construction is being carried out along the highway or interstate, the semi-autonomous cruise control feature may not operate effectively at the areas of construction. Thus, the semi-autonomous cruise control feature may be disabled for these construction areas based on a location of the construction areas. Since this type of roadway state change can affect the functionality (e.g., the availability of vehicle features) the same for a set of vehicles (e.g., vehicles of the same model and model-year), a master geographical vehicle feature map can be maintained and updated so as to consolidate processing and maintenance of vehicle feature availability updates for particular geographical regions. The master geographical vehicle feature map may be maintained at a remote server by an original equipment manufacturer (or third-party associate) and can include geographical and roadway map data for all or most areas in which vehicle backend and/or navigational services are provided, such as all of the United States and other countries in which these services are supported.

Thus, in at least one embodiment, the master geographical vehicle feature map can be maintained at a remote server and can be used to generate and send a localized geographical vehicle feature map based on or derived from the master geographical vehicle feature map to a vehicle. The localized geographical vehicle feature map can include a plurality of geographical regions (e.g., as defined by one or more coordinate pairs), each of which may be associated with one or more vehicle features such that the localized geographical vehicle feature map can be used to determine availability of the one or more vehicle features based on the vehicle's location and/or a pathway of the vehicle. Moreover, as updates of the geographical and/or roadway map data are determined or obtained at the remote server, the master geographical vehicle feature map can be updated and, also, the updated portions of the map can be sent to one or more vehicles based on the vehicle's location. In this way, the availability of vehicle features can be dynamically determined and updated in real-time and in response to changes in roadway conditions.

In many embodiments, the remote server facility can aggregate geographical map data from a variety of sources, including various third party geographical map data providers and geographical feedback application services that are hosted by the remote server facility (or other facility co-owned or co-operated with the remote server facility). In this way, the master geographical vehicle feature map can be maintained at the remote server facility and used for providing accurate geographical and roadway information to one or more vehicles. The remote server facility can automatically update the geographical regions in which certain vehicle features are available based on geographical and/or roadway data collected from various sources. The updates to the master geographical vehicle feature map can then be sent out in the form of a localized geographical vehicle feature map to a plurality of vehicles. Additionally, at least in some embodiments, the vehicles can provide location and sensor information to the remote server facility, which can then incorporate the received location and sensor information into the aggregated geographical map data to corroborate geographical and/or roadway information received from other sources.

With reference to FIG. 1, there is shown an operating environment that comprises a communications system 10 and that can be used to implement the method disclosed herein. Communications system 10 generally includes a vehicle 12 with a wireless communications device 30 and VSMs 22-58, a constellation of global navigation satellite system (GNSS) satellites 60, one or more wireless carrier systems 70, a land communications network 76, a computer or server 78, and a remote server facility 80. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12 (e.g., wireless communications device 30)). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a geographical map provider that supplies geographical and/or roadway maps over the Internet. In one embodiment, roadway maps that include information pertaining to roadway conditions, such as traffic, accident information, outages, and/or construction areas, can be provided from third-party sources. Additionally or alternatively, the roadway maps can include geographical roadway information that includes data representing the geographical boundaries of the roadway with respect to the earth. Other map or geographical information that may be relevant for vehicle operation can be included, such as weather conditions. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as domain name system (DNS) services or as a network address server that uses dynamic host configuration protocol (DHCP) or other suitable protocol to assign an IP address to vehicle 12. In one embodiment, the computers 78 can be third-party geographical map providers that host geographical map information over the Internet (or other cloud-based network). The hosted geographical map information can be downloaded to the remote server facility 80 or vehicle 12 through interaction with an application programming interface (API) hosted by the third-party geographical map provider.

Remote server facility 80 may be designed to provide the vehicle electronics 20 with a number of different system back-end functions through use of one or more electronic servers and, in many cases, may be a vehicle backend services facility that provides vehicle-related backend functionality. The remote server facility 80 includes servers (vehicle backend services servers) 82 and databases 84, which may be stored on a plurality of memory devices. Also, remote facility 80 can include one or more switches, live advisors, an automated voice response system (VRS), all of which are known in the art. Remote facility 80 may include any or all of these various components and, in some embodiments, each of the various components are coupled to one another via a wired or wireless local area network. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. This software (including the map matching software as discussed herein) may be stored in computer-readable memory such as any of the various types of RAM (random access memory) or ROM (read only memory). For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory computer-readable medium; these include different types of RAM (random access memory), ROM (read only memory), and magnetic or optical disc drives that stores some or all of the software needed to carry out the various external device functions discussed herein. One or more databases at the remote facility can store account information such as vehicle services subscriber authentication information, vehicle identifiers, vehicle transactional information, geographical coordinates of the vehicle, and other vehicle information. Also, a vehicle information database can be included that stores information pertaining to one or more vehicles. Additionally, in one embodiment, databases 84 can include geographical map information including geographical roadway map data that digitally represents geographical areas including roadways on the surface of earth. The geographical map data (including the geographical roadway map data) can also include or be based on topographical map information. According to many embodiments, a master geographical vehicle feature map can be stored at databases 84 in a geographical vehicle feature map database. Servers 82 can be used to provide localized geographical vehicle feature maps to a plurality of vehicles, including vehicle 12, so that the vehicles can correlate geographical coordinates (as obtained via GNSS receiver 22) with roadways and the availability of vehicle features. In a particular embodiment, the vehicle 12 can send a localized geographical map request message that includes a geographical location or region of the vehicle and, in response to this message, the server 82 can query master geographical vehicle feature database 84 to obtain geographical vehicle feature map information corresponding to the geographical location or region of the vehicle (i.e., a localized geographical vehicle feature map).

As mentioned above, in at least one embodiment, the databases 84 can include a master geographical vehicle feature map database that holds geographical roadway map data and geographical regions associated with vehicle feature data that indicates whether certain vehicle features are enabled (or available) for the associated geographical region(s). The master geographical vehicle feature map can be created or based on geographical map data obtained from a variety of sources, including third-party geographical map providers and geographical feedback application services. In one embodiment, the servers 82 can send requests to download geographical map data from a third-party geographical map provider, which may be hosted over the Internet (or on a "cloud") using a computer 78. The geographical feedback application services can be an application that is hosted by the remote server facility (or other facility) that collects geographical and sensor information from a plurality of vehicles and then uses the collected information for forming and/or corroborating geographical map data, such as that which is received from the third-party geographical map providers.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a global navigation satellite system (GNSS) receiver 22, body control module or unit (BCM) 24, other vehicle system modules (VSMs) 26, a wireless communications device 30, cameras 40, onboard computer 42, and vehicle-user interfaces 50-58. Some or all of the different vehicle electronics may be connected for communication with each other via one or more communication busses, such as bus 28. Communications bus 28 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

The vehicle 12 can include numerous vehicle system modules (VSMs) as part of vehicle electronics 20, such as the GNSS receiver 22, BCM 24, wireless communications device 30, cameras 40, onboard computer 42, and vehicle-user interfaces 52-58, as will be described in detail below. The vehicle 12 can also include other VSMs 26 in the form of electronic hardware components that are located throughout the vehicle and, which may receive input from one or more sensors and use the sensed input to perform diagnostic, monitoring, control, reporting, and/or other functions. Each of the VSMs 26 is preferably connected by communications bus 28 to the other VSMs, as well as to the wireless communications device 30, and can be programmed to run vehicle system and subsystem diagnostic tests. One or more VSMs 26 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) receiver 22 receives radio signals from a constellation of GNSS satellites. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. GNSS receiver 22 may be used to receive GNSS signals and then to determine GNSS information, including geographical coordinates of the vehicle (e.g., latitudinal coordinates and longitudinal coordinates), heading information, and elevation information. The GNSS receiver 22 can also provide navigation and other position-related services to the vehicle operator using this GNSS information, as well as map information stored locally at the vehicle and updated periodically by the remote server facility 80, for example. Navigation information can be presented on the display 58 (or other display within the vehicle) or can be presented verbally such as is done when supplying turn-by-turn navigation. The navigation services can be provided using a dedicated in-vehicle navigation module (which can be part of GNSS receiver 22), or some or all navigation services can be done via the vehicle communications device (or other telematics-enabled device) installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GNSS receiver 22 from the remote facility 80 via vehicle communications device 30.

In one embodiment, the GNSS receiver 22 may be a GPS receiver, which may receive GPS signals from a constellation of GPS satellites 96. And, in another embodiment, GNSS receiver 22 can be a BDS receiver that receives a plurality of GNSS (or BDS) signals from a constellation of GNSS (or BDS) satellites 60. In either implementation, GNSS receiver 22 can include at least one processor and memory, including a non-transitory computer readable memory storing instructions (software) that are accessible by the processor for carrying out the processing performed by the receiver 22.

Body control module (BCM) 24 is shown in the exemplary embodiment of FIG. 1 as being electrically coupled to communication bus 28. In some embodiments, the BCM 24 may be integrated with or part of a center stack module (CSM) and/or integrated with wireless communications device 30. Or, the BCM may be a separate device that is connected to other VSMs via bus 28. BCM 24 can include a processor and/or memory, which can be similar to processor 36 and memory 38 of wireless communications device 30, as discussed below. BCM 24 may communicate with wireless device 30 and/or one or more vehicle system modules, such as an engine control unit (ECU) (not shown), wheel speed sensor (not shown), steering wheel angle sensor (not shown), yaw rate sensor (not shown), throttle position sensor (not shown), cameras 40, audio system 54, or other VSMs 26. BCM 24 may include a processor and memory accessible by the processor. Suitable memory may include non-transitory computer-readable memory that includes various forms of non-volatile RAM and ROM. Software stored in the memory and executable by the processor enables the BCM to direct one or more vehicle operations including, for example, controlling central locking, air conditioning, power mirrors, controlling the vehicle primary mover (e.g., engine, primary propulsion system), and/or controlling various other vehicle modules.

For example, the BCM 24 can send signals to other VSMs, such as a request for sensor information. And, the BCM 24 may receive data from VSMs, including camera data from cameras 40. Any of this sensor information can be used by a vehicle navigation system to determine a geographical location of the vehicle, such as through use of dead reckoning techniques. Additionally, BCM 24 may provide vehicle state information corresponding to the vehicle state or relating to certain vehicle components or systems, such as information indicating whether a particular vehicle feature is presently enabled, disabled, presently being carried out, and/or scheduled or anticipated as being carried out. For example, the BCM may provide the device 30 with information indicating whether the vehicle's ignition is turned on, which gear the vehicle is presently in (i.e. gear state), whether a semi-autonomous cruise control function is being carried out, whether vehicle mapping data is being collected, a roadway or particular lane the vehicle is travelling in, vehicle speed or velocity (including heading information), observed roadway conditions based on VSM signals (including camera data from cameras 40), and/or other information regarding the vehicle or information obtained by the vehicle using the vehicle's various VSMs. The BCM 24 can obtain information from one or more other vehicle modules to obtain this information, including cameras 40, GNSS receiver 22, and/or an engine control unit (ECU) (not shown).

Cameras 40 can be used to capture photographs, videos, and/or other information pertaining to light. Cameras 40 can be an electronic digital camera that is powered through use of a vehicle battery. Cameras 40 may include a memory device and a processing device to store and/or process data that it captures or otherwise obtains. The data obtained by cameras 40 may be sent to another vehicle system module (VSM) such as wireless communications device 30 and/or BCM 24. Cameras 40 may be of any suitable camera type (e.g., charge coupled device (CCD), complementary metal oxide semiconductor (CMOS)) and may have any suitable lens known in the art. Some non-limiting examples of potential embodiments or features that may be used with cameras 40 include: infrared LEDs for night vision; wide angle or fish eye lenses; surface mount, flush mount, license mount, or side mount cameras; stereoscopic arrangements with multiple cameras; cameras integrated into tail lights, brake lights, or other components at the rear end of the vehicle; and wired or wireless cameras, to cite a few possibilities. In one embodiment, the camera can be positioned on the front of the vehicle and facing an area in front of the vehicle and/or directed downward so that the camera's field of view includes a portion of the roadway near the vehicle. Additionally, cameras can be placed on the sides or back of the vehicle.

In one embodiment, vehicle cameras 40 can be used for a roadway information collection feature, such as a roadway imaging feature (or function), which includes capturing images or video (i.e., camera data) and then obtaining information pertaining to a roadway along which the vehicle is travelling or that is adjacent to the vehicle or roadway along which the vehicle is travelling based on processing the captured images. This camera data can be collected by cameras 40, sent to an onboard computer (e.g., wireless communications device 30) and then sent to a remote server facility, such as remote server facility 80 or other server. The camera data can be used to extract roadway information, including roadway conditions, roadway features (e.g., roadway lane information, speed limit information), and/or geographical features of the roadway or areas surrounding the roadway or the vehicle. Roadway condition information can include traffic information, weather conditions, dynamic roadway information (e.g., temporary roadway features including detours, closures, lane alterations or changes, temporary maximum allowable speed changes, traffic cone locations and/or presence, construction zone areas, accident information including lane closure and/or blockages, significant debris or litter along the roadway), and other information pertaining to traffic and/or the extent to which the roadway is traversable. Roadway features can include regulations associated with a particular roadway or stretch (e.g., portion) of the roadway, such as maximum allowed vehicle speed, passing/no passing information (e.g., whether passing is permitted), lane information (including the number of lanes, the geographical boundaries of lanes, whether a lane change is allowed, direction of travel), whether turns are allowed, traffic signal information (including current traffic signal information (e.g., whether the light is green, red, yellow, non-functional, or blinking/stable)), roadway geometry (e.g., geographical boundaries of the roadway, slope of the roadway, turns and curves along the roadway), and various other information.

Wireless communications device 30 is capable of communicating data via short-range wireless communications (SRWC) and/or via cellular network communications through use of a cellular chipset 34, as depicted in the illustrated embodiment. In the illustrated embodiment, wireless communications device 30 includes an SRWC circuit 32, a cellular chipset 34, a processor 36, memory 38, and antennas 33 and 35. In one embodiment, wireless communications device 30 may be a standalone module or, in other embodiments, device 30 may be incorporated or included as a part of one or more other vehicle system modules, such as a center stack module (CSM), body control module (BCM) 24, an infotainment module, a head unit, and/or a gateway module. In some embodiments, the device 30 can be implemented as an OEM-installed (embedded) or aftermarket device that is installed in the vehicle. In many embodiments, the wireless communications device 30 is a telematics unit (or telematics control unit) that is capable of carrying out cellular communications using one or more cellular carrier systems 70. The telematics unit can be integrated with the GNSS receiver 22 so that, for example, the GNSS receiver 22 and the wireless communications device (or telematics unit) 30 are directly connected to one another as opposed to being connected via communications bus 28.

Additionally, the wireless communications device 30 can be incorporated with or at least connected to a navigation system that includes geographical map information including a localized geographical vehicle feature map and/or geographical roadway map information; note, in some embodiments, the geographical roadway map information can be included as a part of the localized geographical vehicle feature map. The navigation system can be communicatively coupled to the GNSS receiver 22 (either directly or via communications bus 28) and can include an on-board geographical map database that stores such geographical map information including the localized geographical vehicle feature map. This geographical map information can be provisioned in the vehicle when purchased or initialized after manufacture, or may be downloaded via a remote connection to a geographical map database/server, such as computer 78 and/or remote facility 80 (including servers 82 and databases 84). The on-board geographical map database can store geographical map information corresponding to a location or region of the vehicle so as to not include a large amount of data, much of which will most likely never be used for a given vehicle. For example, the localized geographical vehicle feature map includes vehicle features associated with geographical regions of an area local to the vehicle, such as a metropolitan area or areas corresponding to past vehicle travel. Moreover, as the vehicle enters different locations or regions, the vehicle can send a localized geographical vehicle feature map request informing the vehicle backend services facility 80 of the vehicle's location (e.g., obtained via use of GNSS receiver 22) and/or route. In response to receiving localized geographical vehicle feature map request (including the vehicle's new location or route), the servers 82 can query databases 84 for the corresponding geographical map information, such as localized geographical vehicle feature map for the area corresponding to the vehicle's location. The servers 82 can then send this information to the vehicle in the form of a localized geographical vehicle feature map response.

In some embodiments, wireless communications device 30 can be configured to communicate wirelessly according to one or more short-range wireless communications (SRWC) such as any of the Wi-Fi™, WiMAX™, Wi-Fi Direct™, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70.

Wireless communications device 30 may enable vehicle 12 to be in communication with one or more remote networks (e.g., one or more networks at remote facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may be a temporary powered memory or any non-transitory computer-readable medium; these include different types of RAM (random access memory) and ROM (read only memory) that stores some or all of the software needed to carry out the various external device functions discussed herein. Similar components to those previously described (processor 36 and/or memory 38, as well as SRWC circuit 32 and cellular chipset 34) can be included in body control module 24 and/or various other VSMs that typically include such processing/storing capabilities.

Onboard computer 42 is a vehicle system module (VSM) that includes a processor (not shown) and memory (not shown). In some embodiments, an onboard computer 42 can be separately included in the vehicle electronics and, in at least one embodiment, the onboard computer 42 can be an infotainment unit that is in communication with a telematics unit or other wireless communications device, such as wireless communications device 30. In other embodiments, onboard computer 42 can be incorporated with other VSMs, including wireless communications device 30; in such a case, processor 36 and memory 38 can be used by the onboard computer 42 and communication circuitry of wireless communications device 30. Additionally, at least in some embodiments, onboard computer 42 can be an infotainment unit (e.g., infotainment head unit, in-car entertainment (ICE) unit, in-vehicle infotainment (IVI)), a vehicle head unit, a center stack module (CSM), or vehicle navigation module.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 28 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display and can be used to provide a multitude of input and output functions. Display 58 can be a touch screen on the instrument panel, a heads-up display reflected off of the windshield, or a projector that can project graphics for viewing by a vehicle occupant. Any one or more of these vehicle-user interfaces that can receive input from a user can be used to receive a driver override request, which is a request to cease operating the one or more VSMs as a part of the immersive media experience. Various other vehicle user interfaces can also be utilized, as the interfaces of FIG. 1 are only an example of one particular implementation.

With reference to FIGS. 2 through 5, there are shown embodiments of a localized geographical vehicle feature map. It should be appreciated that various different forms of localized geographical vehicle feature maps can be used and that the embodiments illustrated in FIGS. 2 through 5 represent illustrations of some such localized geographical vehicle feature maps for purposes of facilitating the discussion of the methods and/or systems disclosed herein.

Figure 2:
FIG. 2 is a block diagram depicting an embodiment of a localized geographical vehicle feature map.
Figure 3:
FIG. 3 is a block diagram depicting an embodiment of a localized geographical vehicle feature map.
Figure 4:
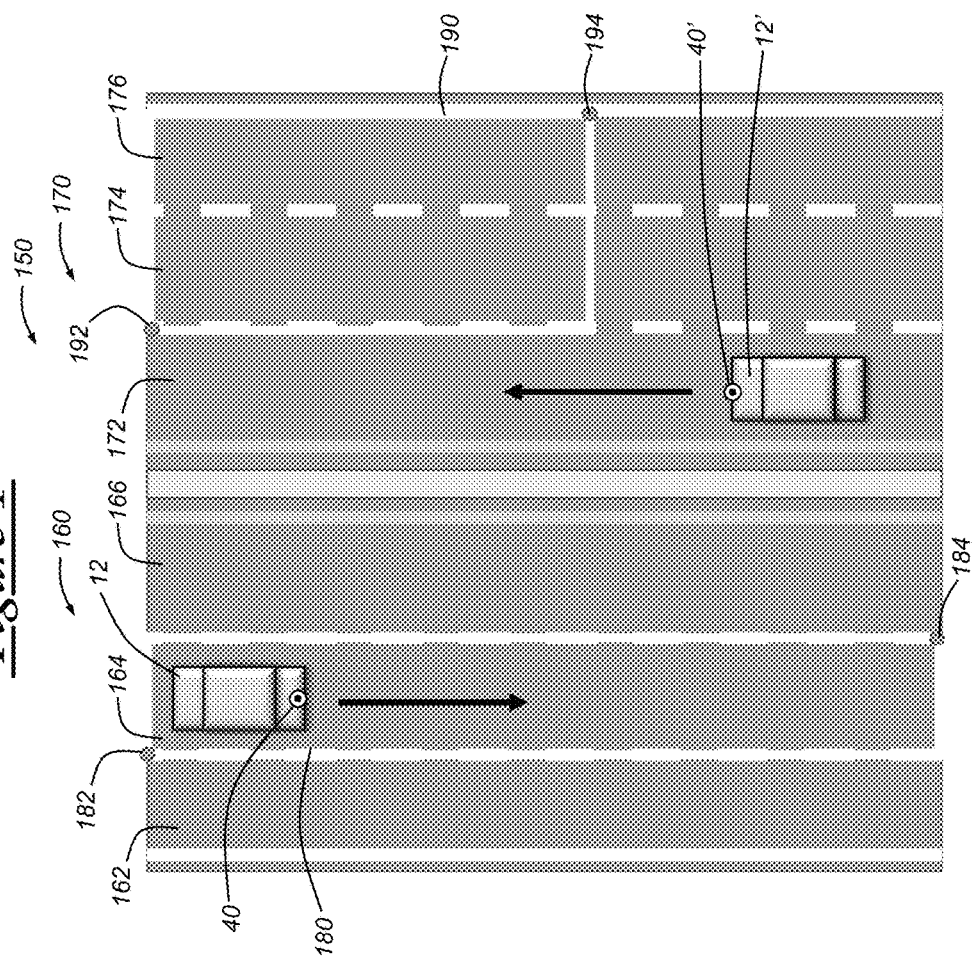
FIG. 4 is a block diagram depicting an embodiment of a portion of a localized geographical vehicle feature map showing geographical regions in which a vehicle feature is available and/or enabled.

With reference to FIG. 2, there is shown an illustrative embodiment of a localized geographical vehicle feature map 100 that includes a plurality of geographical regions or zones 110 (only a few are labeled in FIGS. 2-4). The regions 110 are illustrated as a grid, although, in other embodiments, the regions could be in the form of other shapes. The regions may be defined by geographical coordinate pairs. For example, each region may be defined using a single latitude/longitude coordinate pair along with a radius such that the coordinate pair identifies the center of a circular geographical region and the radius identifies the expanse (area) of the region. Alternatively, the region could be defined as a polygon using coordinate pairs as its vertices. For example, in one embodiment, the geographical region may be defined using a first geographical coordinate pair representing a North-West point and a second geographical coordinate pair representing a South-East point; in this way, a bounding rectangle can be represented by only two coordinate pairs so as to reduce data and/or memory usage. In other embodiments, more than two coordinate pairs can be used to identify the boundaries of the geographical regions 110.

Also, as shown in FIG. 2, there is shown geographical regions 120, which include vehicle feature data (the grayed-out regions). Geographical regions 120 include geographical region information associated with vehicle feature data that indicates the availability of one or more vehicle features, such as whether one or more vehicle features or functions are enabled and/or disabled for the associated geographical region. Where vehicle feature data is not present for a particular geographical region, default vehicle feature data can be used (which can be stored in memory and/or updated via over-the-air (OTA) updates from remote server facility 80). In other embodiments, the vehicle may not include separate default vehicle feature data, but may operate according to its normal operating procedures. Additionally, vehicle feature data can include a vehicle feature buffer value that indicates a distance or time in which a vehicle feature will remain enabled (or disabled) upon the vehicle entering a region associated with the vehicle feature disabled (or enabled) so that the vehicle has time to re-enter the vehicle region or another vehicle region where the vehicle feature is enabled (or disabled) so that the vehicle feature does not turn off (or on) upon the vehicle exiting the region for a short amount of time.

In one embodiment, a semi-autonomous cruise control feature can be enabled for certain roadways, such as interstates or highways. As shown in FIG. 2, the regions 120 that encompass a portion of roadway 102 include vehicle feature data indicating a vehicle feature is available, which can be data indicating that the semi-autonomous cruise control feature is available for those regions 120. Thus, when the vehicle determines that it is within a region 120 (and/or along the roadway 102), the vehicle can enable the semi-autonomous cruise control feature. In one embodiment, the vehicle feature can automatically be carried out upon entering the region 120 where the feature is enabled and/or may enable the feature so that it can be carried out upon certain conditions being met, such as a command from an operator to carry out the feature. In one embodiment, customer-facing vehicle features (i.e., those features whose operation is readily perceivable by the operator (or passenger)) may not be automatically carried out, but may become enabled so that the vehicle is in a state in which, when a command to carry out the feature is received, the vehicle can carry out the feature or corresponding functions; as used herein, enabling a vehicle feature, but not necessarily automatically carrying it out can be referred to as placing the vehicle feature in a ready-state.

As mentioned above, the vehicle feature data can include information concerning multiple vehicle features. Additionally, each of these vehicle features can be identified by a vehicle feature identifier or other information that can uniquely identify the vehicle feature. And, in some embodiments, the vehicle feature data can include more information than simply whether a particular vehicle feature is enabled or not. For example, the vehicle feature data can include vehicle features whose enablement or performance is predicated on a set of conditions or requirements, such as vehicle state conditions or requirements and/or roadway state conditions or requirements. Vehicle state information can be obtained by BCM 24 from various vehicle system modules and then monitored in light of the vehicle state conditions to determine whether the conditions have been met. Upon meeting the conditions, the vehicle can enable (or perform) the associated vehicle feature. In other embodiments, vehicle feature parameters can be included in the vehicle feature data. The vehicle feature parameters can include operating parameters that are to be followed and/or used for carrying out and/or enabling/disabling various vehicle features. For example, the semi-autonomous cruise control feature may include a maximum semi-autonomous cruise control speed that is available for a particular geographical region and, thus, the feature may be carried out for speeds at or below the maximum semi-autonomous cruise control speed.

With reference to FIG. 3, there is shown an updated version of the localized geographical vehicle feature map 100. As discussed below, the remote server facility 80 can send updates to the localized geographical vehicle feature maps that are maintained at the vehicle 12. These updates may include vehicle feature data of new geographical regions in which the vehicle has not previously obtained localized geographical vehicle feature map data. Or, the updates can reflect a change in the availability of vehicle features for certain geographical regions and/or updates in the boundaries of the geographical regions. As shown in FIG. 3, a portion of the roadway 102 includes a roadway construction area 130. Due to the cautionary measures that may preferably be taken around roadway construction areas, certain semi-autonomous and/or fully-autonomous features may be disabled and/or modified. Thus, in the construction area 130, the semi-autonomous vehicle feature is disabled as illustrated by the removal of the grayed-out regions (compare with FIG. 2). In one embodiment, the vehicle 12 can inform a vehicle operator that there is an outage area along the roadway 102 on which the vehicle is travelling or along the route of the vehicle 12. The outage area can indicate an area in which the semi-autonomous cruise control feature or other vehicle feature is disabled or not available. Upon receiving a localized geographical vehicle feature map update, the vehicle can use vehicle-user interfaces, such as audio system 54 and/or visual display 58 to inform the vehicle operator or driver that the semi-autonomous cruise control feature will soon be terminated so that the vehicle operator can prepare to take control of the vehicle or otherwise operate the vehicle without the semi-autonomous cruise control feature.

With reference to FIG. 4, there is shown another embodiment of the localized geographical vehicle feature map 150. FIG. 4 illustrates a first geographical region 180 and a second geographical region 190 along roadways 160 and 170, respectively. Vehicle 12 is shown as travelling within lane 164 and vehicle 12' (another instance of vehicle 12) is shown as travelling within lane 172. Geographical region 180 is shown as encompassing the lane 164 and geographical region 190 is shown as encompassing a portion of the lanes 174 and 176. The long, straight arrows indicate a direction of travel of the vehicles 12 and 12'. Region 180 is defined by coordinates (e.g., coordinate pairs) 182 and 184, while region 190 is defined by coordinates 192 and 194.

In some scenarios, the vehicle backend system may desire to obtain roadway information concerning particular lanes and/or particular stretches of a roadway and, thus, geographical regions pertaining to these areas can be defined, such as geographical regions 180 and 190. As mentioned above, vehicle 12 may include use cameras 40 to carry out the roadway imaging feature. This roadway imaging feature can include using cameras 40 to capture or otherwise obtain images of the roadway on which the vehicle is travelling and, then, use the captured images to obtain information concerning the roadway, including roadway geometry information, road signage or signaling information, traffic information, roadway conditions (including construction and/or weather conditions), and/or various other information concerning the roadway. In one embodiment, the geographical regions 180 and 190 can correspond to a lane or other area of the roadway on which the vehicle is travelling (or is in route to). The geographical regions 180 and 190 can be associated with the roadway imaging feature and, thus, when the vehicle travels in the geographical regions 180 and 190, the roadway imaging feature can be automatically carried out (or enable and then carried out upon initiation of the feature, such as by a vehicle operator). This enables the vehicle 12 to collect information concerning those areas or regions in which the vehicle backend system desires to obtain more information. In this way, the vehicle 12 can only obtain roadway information concerning specific areas (as defined by the geographical regions) so that transmission and storage costs can be reduced through only collecting, transmitting, and storing information concerning those specific areas in which the vehicle backend system desires information.

In a particular embodiment, the geographical regions 180 and 190 can be associated with incentives that can be used to motivate operators to drive their vehicle to or within a particular geographical region. For example, as mentioned above, the vehicle backend system may desire to obtain roadway information concerning particular lanes and/or particular stretches of a roadway and, thus, when the vehicle is driven in the particular lanes or stretches, rewards can be given to the vehicle operator, such as crediting a vehicle operator's account or awarding "points" that can be used to redeem rewards. Thus, the geographical regions 180 and 190 can be associated with the roadway imaging feature and an incentivizing feature that can be used to reduce transmission and storage costs, as well as motivate drivers to operate the vehicle in a way that results in collecting the desired information. The vehicle 12 can use visual display 58 to inform the operator of the geographical regions 180 and 190, as well as to inform the operator that certain incentives (including "points") can be obtained by driving or operating the vehicle in the geographical regions 180 and 190. Additionally, when used with autonomous or semi-autonomous vehicles, the vehicle may prefer to drive in geographical regions 180 and 190 so that the vehicle backend system can obtain the desired information.

Figure 5:
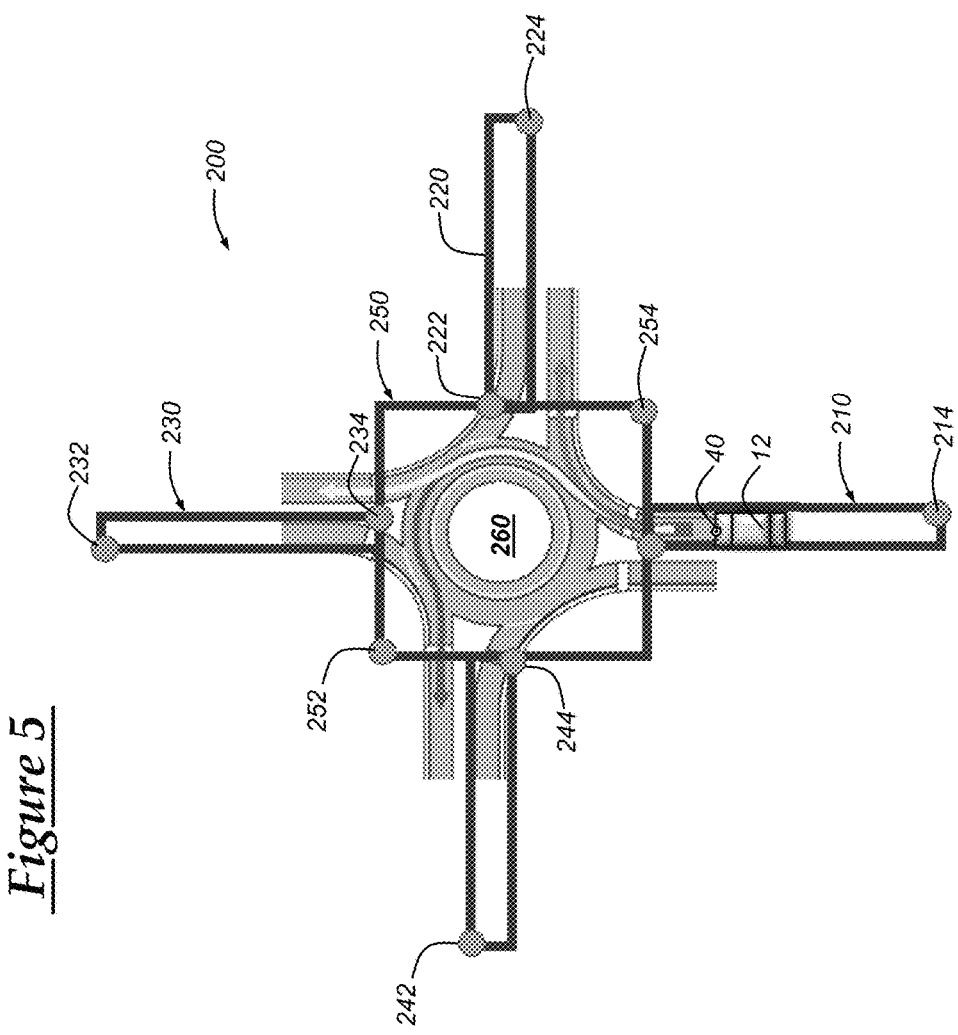
FIG. 5 is a block diagram depicting an embodiment of a portion of a localized geographical vehicle feature map showing geographical regions in which a vehicle feature is not available and/or disabled.

With reference to FIG. 5, there is shown another embodiment of the localized geographical vehicle feature map 200. FIG. 5 illustrates a first geographical region 210, a second geographical region 220, a third geographical region 230, a fourth geographical region 240, and a fifth geographical region 250. Vehicle 12 is shown as approaching a traffic circle 260, which is surrounded by the fifth geographical region 250. In some embodiments, certain vehicle features may be disabled at the traffic circle 260, such as the semi-autonomous cruise control feature. For example, the semi-autonomous cruise control feature may use a front-facing camera 40 and, in some scenarios, the camera 40 may not be configured or able to obtain information around a curve. Thus, since traffic circles may include curves (including curves with a relatively small radii of curvature), the vehicle feature associated with the traffic circle region 250 may be a disabled semi-autonomous cruise control feature such that the semi-autonomous cruise control feature is disabled at the traffic circle. Moreover, regions 210 through 240, which are defined by points 212 through 244, can be associated with entrance lanes to the traffic circle 260 and these lanes can be associated with a vehicle feature that informs vehicle operators or passengers that certain features, such as the semi-autonomous cruise control feature is disabled at the traffic circle 260 ahead. Thus, upon the vehicle entering region 210, vehicle-user interfaces can be used to inform a vehicle operator user that the semi-autonomous cruise control feature is disabled ahead thereby giving the operator time to prepare to take control of the vehicle. In other embodiments, the vehicle 12 can determine that it is approaching region 250 and that the semi-autonomous cruise control feature is disabled at region 250. Thus, when the vehicle is a predetermined distance or time away from the traffic circle 260 (or region 250), the vehicle 12 can inform the vehicle operator of that the semi-autonomous cruise control feature is disabled at region 250. In such a scenario, regions 210 through 240 may not be needed.

In another embodiment, a vehicle feature could relate to a maximum set vehicle speed. For example, a primary operator of the vehicle 12 could specify a particular maximum speed for a particular geographical region. Thus, the vehicle could, when operating within the particular geographical region, only allow acceleration up to, but not exceeding the maximum set vehicle speed. In some embodiments, the vehicle maximum set vehicle speed for a particular geographical region can be based on surrounding roadways. GNSS processing, such as that by GNSS receiver 22, can sometimes include small calculation errors and, thus, the vehicle may determine that the vehicle is within the particular geographical region, when the vehicle actually is not. Thus, to combat such GNSS errors, a buffer distance amount or time (between exiting and entering the particular geographical region) can be set so that the speed is not restricted when the vehicle temporarily enters the particular geographical region. Additionally, in some embodiments, geographical regions can be defined to have higher maximum speeds higher than a speed limit of that area when it is known or predicted that the geographical regions are near a roadway permitting faster vehicle speed.

In yet another embodiment, front-facing camera 40 can be used to obtain current traffic signal information (e.g., whether the light is green, red, yellow, non-functional, or blinking/stable). This current traffic signal information can be obtained through capturing images using camera 40 and then processing the captured images to resolve a traffic signal at that time. This information can then be sent to a remote facility, such as remote facility 80, which can then use the traffic signal information to corroborate traffic signal information regarding the same traffic signal that is obtained from other sources. In a particular example, an intersection could be identified as having connectivity problems where the traffic signaling (e.g., traffic light) data being provided is inaccurate and, thus, a message can be generated and sent to the vehicle (as a part of the localized geographical vehicle feature map update) that specifies that camera data (or other sensor data) may or should be used to verify the signaling of the traffic signal device at the intersection or that such intersection should be avoided. This information can be used to update the master geographical vehicle feature map, which can then be used to update the localized geographical vehicle feature map.

With reference to FIG. 6, there is shown a method 300 of enabling or disabling vehicle features based on vehicle location. Method 300 can be carried out by one or more computer programs that are stored on a non-transitory, computer-readable medium, and wherein one or more electronic servers (e.g., servers 82) located at the remote server facility are configured to execute the one or more computer programs thereby implementing the method 300. Generally, method 300 can include the steps of maintaining a master geographical vehicle feature map at a remote server facility, receiving an indication of updated map data, updating the master geographical vehicle feature map using the updated map data, receiving a localized geographical vehicle feature map request, and sending a localized geographical vehicle feature map response. However, various other embodiments exist, as will be apparent from the discussion below in light of the discussion of system 10 provided above.

Method 300 begins with step 310, wherein a master geographical vehicle feature map is maintained. As mentioned above, databases 84 can store the master geographical vehicle feature map including geographical and roadway information corresponding to one or more states, countries, or other regions or territories. The geographical map information can include geographical coordinates of the surface of earth, including latitudinal coordinates, longitudinal coordinates. The geographical map data can include other information such as vehicular roadway information (i.e., geographical roadway map data), which includes data representing roadways among the geographical regions, and/or vehicular airway information (i.e., airway map data), which includes data representing airways among the geographical regions. The geographical roadway map data can include various additional information, such as roadway dimensions, roadway attributes (e.g., speed limit, permitted direction of travel, lane information, traffic signal information), roadway conditions (e.g., present or estimated traffic conditions, predicted and/or observed weather conditions among the roadway), and various other information. This geographical map data can be provided to the vehicle periodically and, when doing so, the provided geographical map data can be refined to reflect information concerning an area surrounding or local to the vehicle, such as a metropolitan area of a large city in which the vehicle is located or nearby.

Additionally, the master geographical vehicle feature map includes information pertaining to various vehicle features, such as whether certain vehicle features are enabled (available) or disabled (not available) for certain geographical regions, which can be defined by geographical coordinates. The vehicle feature data can include information about particular vehicle features, some of which may be unique or only applicable to vehicles of a certain model, model year, or other classification.

In some embodiments, the master geographical vehicle feature map can be constructed from geographical map information obtained from third-party geographical map providers. Additionally, at least in one embodiment, information contained within the master geographical vehicle feature map can be updated or altered by map matching software (or other map processing software) that is executed by one or more servers 82 of the remote server facility 80. The map matching software can also use geographical and/or sensor information obtained by the vehicle 12 (e.g., via GNSS receiver 22, cameras 40, or other vehicle sensors) to correct, update, or alter information stored in the master geographical vehicle feature map, as well as other information kept at remote server facility 80. For example, roadways may be altered (e.g., a lane may be added or removed, a traffic circle may be used to replace an electronic traffic signal) and, thus, geographical and/or sensor information obtained from the vehicle can be used to adjust or update the master geographical vehicle feature map that is maintained in databases 84. The method 300 continues to step 320.

In step 320, an indication of updated map data is received. The updated map data indication can include information indicating that updated map information, including updated geographical roadway information, is available. This indication can be received from a third party map provider via and network 76 and can include information concerning the updated data, such as coordinates in which the updated data corresponds and/or the type of data being updated (e.g., roadway geometry, traffic). In a particular embodiment, the remote server facility 80 can use servers 82 to send map update requests to other facilities or third party providers and, then, receive a response that indicates whether updated map data is available for download or obtainment. The method 300 continues to step 330.

In step 330, the master geographical vehicle feature map is updated based on the updated map data. The update map data can be obtained in response to the updated map data indication and can be obtained via download of one or more packets or messages using land network 76 and/or cellular carrier system 70. In one embodiment, the update map data may be stored at a third party map provider's server and the remote server facility 80 can use an application programming interface (API) hosted by the third party map provider's server to request the updated map data. Once the map data is downloaded or otherwise obtained at the remote server facility 80, the remote server facility 80 can process the map data and then store the map data in databases 84. The processing and storing may take place at the end of the entire download of the updated map data or may take place upon completing download of certain packets or segments of the updated map data. The method 300 continues to step 340.

In step 340, a localized geographical vehicle feature map request is received. The localized geographical vehicle feature map request can include a request to obtain updated or new (i.e., not yet stored at the vehicle) geographical vehicle feature map information. For example, the vehicle 12 may enter, approach, or be in route towards a new location and the vehicle may not have localized geographical vehicle feature map data concerning that new location. Thus, the vehicle 12 can include its location and/or the new location in the localized geographical vehicle feature map request so that a response that includes the localized geographical vehicle feature map data concerning that new location will be sent and received at the vehicle 12 (see step 350). In one embodiment, the localized geographical vehicle feature map request may merely be a message that indicates the vehicle's location and/or the new location that the vehicle is approaching or in route towards. Or, in other embodiments, the localized geographical vehicle feature map request may be a message designed to prompt a particular response that includes localized geographical vehicle feature map information. The method 300 continues to step 350.

In step 350, a localized geographical vehicle feature map response is sent to the vehicle 12. The localized geographical vehicle feature map response can include localized geographical vehicle feature map data concerning a location indicated in the localized geographical vehicle feature map request. For example, as mentioned above, the vehicle may be in a new location, approaching a new location, and/or in route towards a new location. Thus, localized geographical vehicle feature information can be obtained from a database (e.g., databases 84), processed (e.g., packaged for delivery), and then sent to vehicle 12.

In another embodiment, instead or in addition to carrying out steps 340 and 350, the remote server facility 80 can send localized geographical vehicle feature map updates to vehicle 12 in response to receiving updated map information (see step 320). Thus, after the master geographical vehicle feature map is updated, the remote server facility can determine which vehicles include a localized geographical vehicle feature map of the updated geographical areas and, thereafter, the remote server facility 80 can send the updated information to those vehicles. The method 300 then ends.

With reference to FIG. 7, there is shown a method 400 of enabling or disabling vehicle features based on vehicle location. Method 400 can be carried out by vehicle 12 using one or more computer programs that are stored on a non-transitory, computer-readable medium. The computer programs can be stored in memory of vehicle 12, such as memory 38, and the vehicle 12 may include processing device(s) configured to execute the one or more computer programs thereby implementing the method 400. The vehicle can execute a map-based vehicle feature enablement application that is stored in memory and that causes the vehicle electronics to carry out the steps of method 400. Generally, method 400 can include the steps of receiving a localized geographical vehicle feature map from a remote server facility, determining a location of the vehicle, obtaining vehicle feature data based on the vehicle's location, enabling/disabling vehicle functionality based on the vehicle feature data, and notifying a vehicle operator or passenger of a vehicle feature change. However, various other embodiments exist, as will be apparent from the discussion below in light of the discussion of system 10 provided above.

Method 400 begins with step 410, wherein a localized geographical vehicle feature map is received at the vehicle. The localized geographical vehicle feature map can include geographical information (including geographical roadway information) of regions local to vehicle 12, including regions within a predetermined radial distance and/or within a predetermined driving distance (or driving time) of the vehicle or of a location associated with the vehicle, such as the vehicle owner's or user's home location. In one embodiment, the localized geographical vehicle feature map can be downloaded using cellular carrier system 70 and/or land network 76. In a particular embodiment, the localized geographical vehicle feature map can be received via an over-the-air (OTA) update. In other embodiments, the vehicle 12 can be provisioned or configured with the localized geographical vehicle feature map at a time of sale, lease, change of ownership, and/or upon service at a service facility. Additionally, as discussed above, updates to the localized geographical vehicle feature map can be received by vehicle 12 and then incorporated into the localized geographical vehicle feature map. The method 400 continues to step 420.

In step 420, a location of the vehicle is obtained. The location of the vehicle can include the present location of the vehicle (as determined, for example, through GNSS receiver 22), a location that the vehicle is approaching (such as a location down the road from the vehicle), and/or a location on a route in which the vehicle is travelling or is ostensibly going to travel on. This step may be carried out in response to step 410 and/or may be periodically carried out. In one embodiment, the vehicle 12 can use GNSS receiver 22 to receive GNSS signals from a plurality of GNSS satellites and, then, to use the GNSS signals to determine a coordinate location of the vehicle 12 and/or other GNSS information, including vehicle speed and/or heading. In another embodiment, the vehicle may obtain navigational information from a vehicle navigation system, where the navigational information includes a location and/or route from a start location to an end location. In yet another embodiment, navigational information can be obtained from a personal handheld mobile device that is connected to wireless communications device 30 (or other VSM) via SRWC or via a wired connection, such as a Universal Serial Bus (USB) connection. The method 400 continues to step 430.

In step 430, vehicle feature data is obtained based on the location and/or pathway (or route) of the vehicle. In one embodiment, once the vehicle location (and/or pathway) is determined, the vehicle can query the localized geographical vehicle feature map stored thereat to obtain vehicle feature data. For example, the vehicle can determine one or more geographical regions that encompass the vehicle's location (as obtained in step 420) and, then, can extract vehicle feature data associated with the one or more geographical regions. In some embodiments, the vehicle may determine that no localized geographical vehicle feature map data corresponding to the obtained location is available or stored at the vehicle 12 and, thus, the vehicle can send a localized geographical vehicle feature map request to the remote server facility (see step 340 of method 300 (FIG. 6)). In response, the vehicle can receive a localized geographical vehicle feature map response that includes the localized geographical vehicle feature map data corresponding to the obtained location.

The vehicle feature data can include one or more vehicle features that are enabled (or available) or disabled (or unavailable) for a particular geographical region. The vehicle features can include any feature or vehicle function that can be at least partially electronically controlled, carried out, and/or disabled/enabled. For example, as mentioned above, a semi-autonomous cruise control feature may be disabled for regions where construction is presently being carried out and, thus, vehicle feature data indicating that the semi-autonomous cruise control feature is disabled can be obtained. The method 400 continues to step 440.

In step 440, one or more vehicle features can be disabled or enabled based on the obtained vehicle feature data. This can include configuring one or more vehicle system modules (VSMs) to enable or disable a particular vehicle function or a set of vehicle functions. The configuring can include generating and sending an enable or disable message to the one or more VSMs informing the VSMs to enable or disable the vehicle function(s) and/or otherwise causing the vehicle function(s) to be enabled or disabled according to the vehicle feature data. The enable/disable messages can be generated in response to determining whether a particular vehicle feature or function is presently enabled or disabled, determining whether the particular vehicle feature or function is to be enabled or disabled for a particular geographical region as indicated by the vehicle feature data, and whether the first determination (of whether the particular vehicle feature or function is presently enabled or disabled) corresponds to the second determination (of whether the particular vehicle feature or function is to be enabled or disabled for a particular geographical region as indicated by the vehicle feature data). The enable/disable messages can be sent, for example, wireless communications device 30 to other VSMs via communications bus 28. The method 400 then continues to step 450.

In step 450, the vehicle can inform vehicle operators or passengers that a particular vehicle feature or function is enabled or disabled, or is going to be enabled or disabled. In one embodiment, this step can include generating a notification using wireless communications device 30 and, then, presenting the notification to the vehicle operators or passengers via vehicle-user interfaces, such as audio system 54 and/or visual display 58. In at least one embodiment, the notification notifies a vehicle operator of a change in vehicle operation, such as the unavailability of a semi-autonomous or autonomous vehicle propulsion or steering feature so as to give the operator time to prepare to take over vehicle propulsion or steering control. Various other types of notifications can be provided as those skilled in the art will appreciate. The method 400 then ends.

Figure 8A:
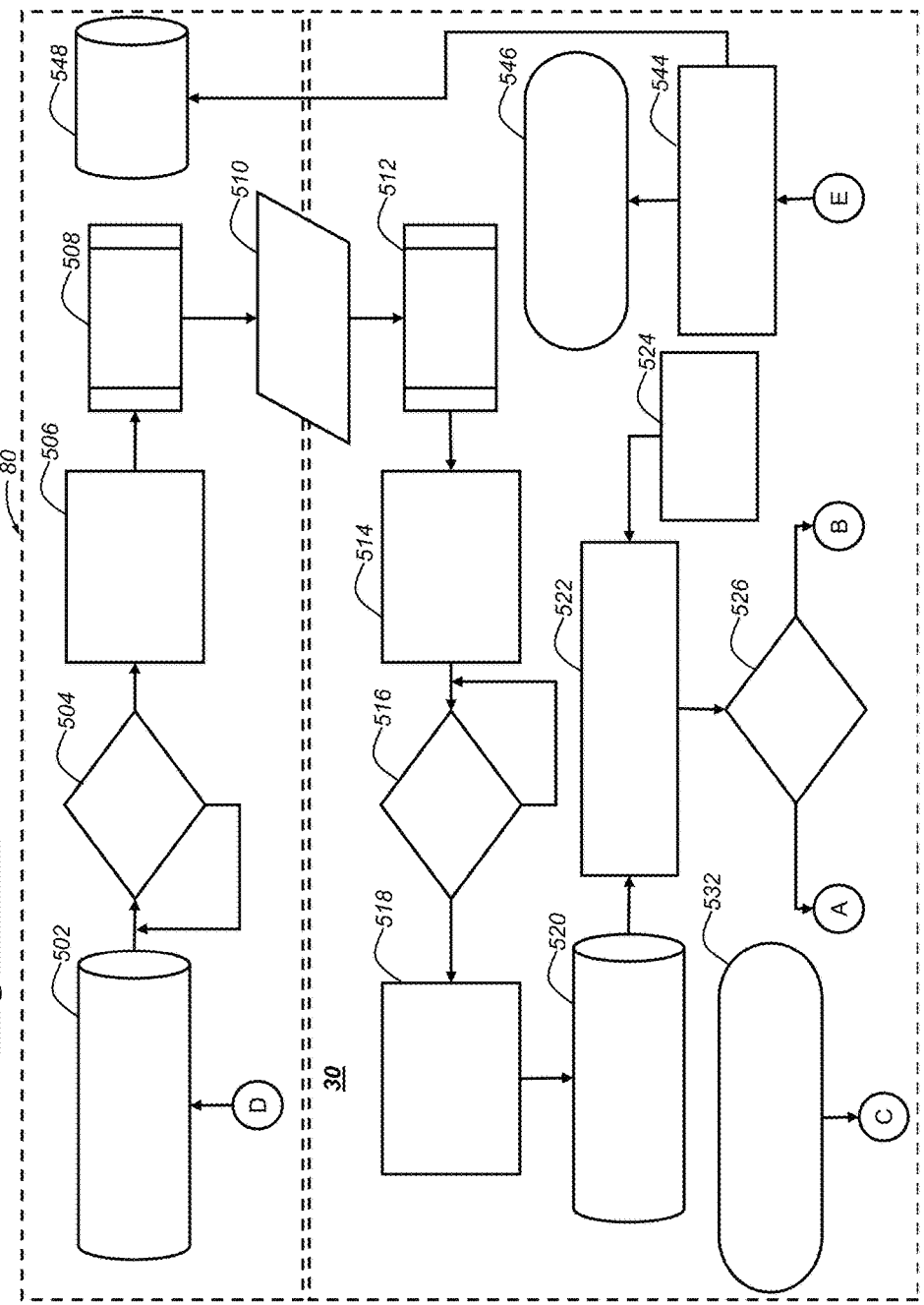
FIGS. 8A-8B depict a flowchart of yet another embodiment of a method of enabling or disabling vehicle features based on vehicle location.
Figure 8B:
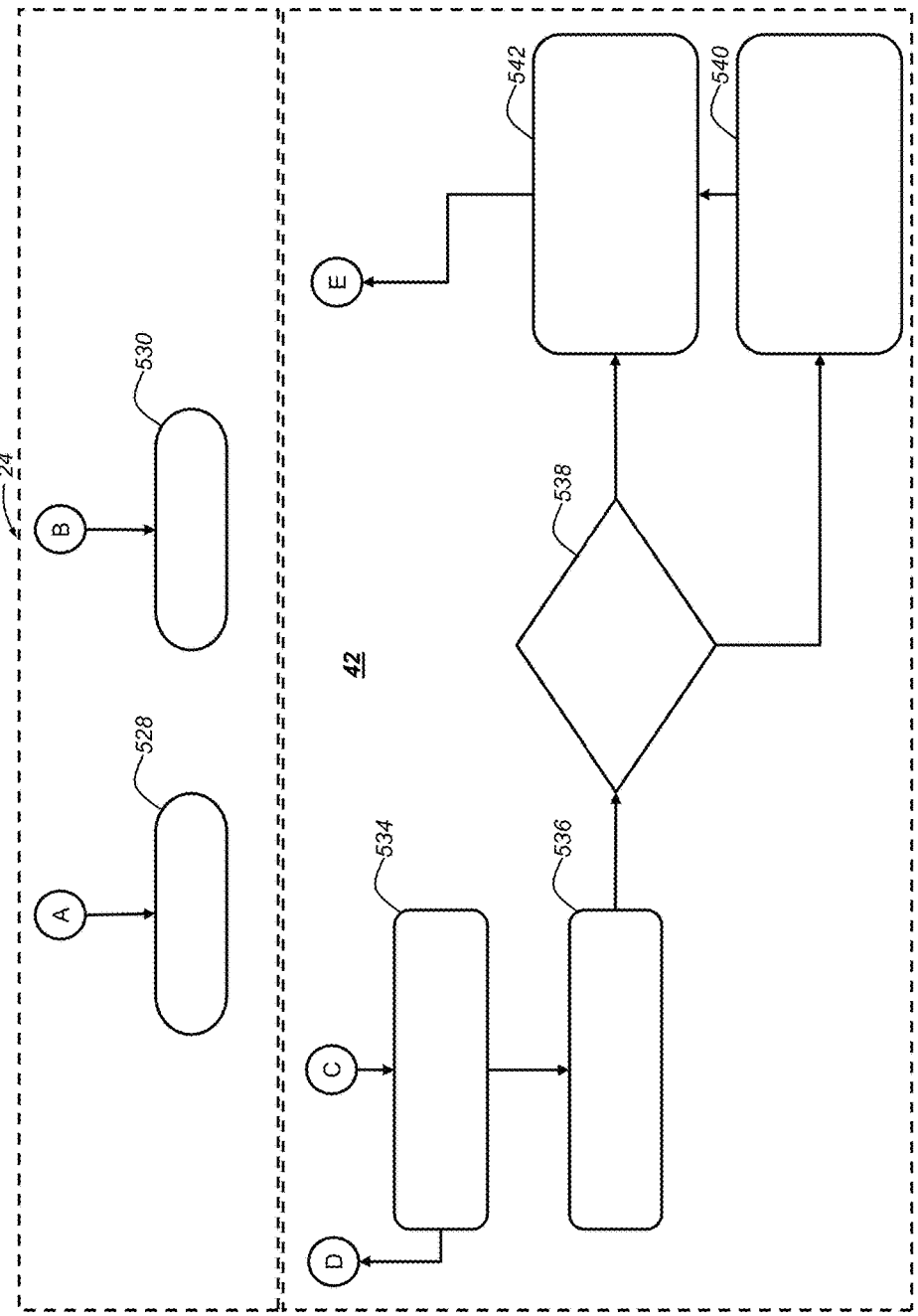

With reference to FIG. 8, there is provided an embodiment of a method 500 of enabling or disabling vehicle features based on vehicle location. The dashed boxes indicate which device or components are carrying out or associated with each step or element. The vehicle can execute a map-based vehicle feature enablement application that is stored in memory and that causes the vehicle electronics to carry out the steps of method 500. Method 500 begins with step 502, wherein a master geographical vehicle feature map is maintained at the remote facility 80. This step can include those characteristics and features as described above, such as those discussed with respect to step 310 of method 300 (FIG. 6). The method 500 proceeds to step 504 where an update or change to geographical information or vehicle feature information is realized or otherwise determined. This step is analogous to step 320 of method 300 (FIG. 6). In step 506, the remote server facility 80 determines which vehicles to send update geographical vehicle feature map data to. As mentioned above, the vehicles can be selected based on the vehicle's location (or anticipated location) in conjunction with information indicating which geographical regions were updated. Additionally, this step may depend or be based on the type of vehicle, such as the make, model, and/or whether the vehicle has a particular vehicle feature or is capable of such vehicle feature. In step 508, the updated localized geographical vehicle feature map data is transmitted to the vehicles, as illustrated by element 510.

In step 512, the localized geographical vehicle feature map data is received at the vehicle 12, specifically at the wireless communications device 30. The information can then be stored and/or saved. In step 514, the vehicle determines when the localized geographical vehicle feature map is to be updated. For example, in one embodiment, updating the localized geographical vehicle feature map may be desirable when the vehicle is in a parking gear and/or when the vehicle is not otherwise being used by an operator. And, in some embodiments, the time or period of the updating step may be based on information contained within the localized geographical vehicle feature map update itself, such as based on vehicle feature data. For example, enabling and/or disabling certain vehicle features at certain times or when the vehicle is in a particular state may prove undesirable and/or dangerous. Thus, the vehicle can, based on the vehicle feature data, determine when to update the localized geographical vehicle feature map. In step 516, the vehicle determines that the update time is reached and, then, continues to step 518.

In step 518, the localized geographical vehicle feature map is updated based on the received localized geographical vehicle feature map update data (step 512). The update can include processing the updated data, as well as the already stored localized geographical vehicle feature map to update certain geographical regions and/or vehicle feature data contained in the localized geographical vehicle feature map such that the localized geographical vehicle feature map is maintained (step 520). Once the localized map is updated, the method continues to step 522, wherein certain vehicle features are determined to be available based on the geographical region, which is determined in step 524 using, for example, GNSS signals obtained from a constellation of GNSS satellites 60 (through use of GNSS receiver 22). In step 526, if it is determined that a particular vehicle feature is available in the geographical region, then the method continues to step 528 where an enable message is generated and sent to a VSM that carries out at least part of the vehicle feature. And, in step 526, if it is determined that a particular vehicle feature is unavailable in the geographical region, then the method continues to step 528 where an disable message is generated and sent to a VSM that carries out at least part of the vehicle feature.

Steps 532 through 548 illustrate an embodiment of a roadway information collection feature that can be carried out by the vehicle. In step 532, it is determined that the vehicle enters a particular geographical region associated with vehicle feature data that indicates the roadway information collection feature is enabled and, thus, a roadway information collection application included on the vehicle is woken up and/or presently active. In step 534, the roadway information collection application connects to a remote server, such as those present at remote server facility 80. The vehicle 12 can connect to a roadway information collection application that is running on the server side and that hosts and/or communicates with the vehicle-hosted roadway information collection application. In step 536, the server checks for updates regarding the geographical regions or areas in which information is to be obtained from. Then, when it is determined that there are new updates that affect the vehicle 12 (e.g., based on vehicle 12's location as sent from vehicle 12 to remote server facility 80), then step 540 is carried out; otherwise, the method 500 proceeds to step 542. In step 540, the server-side roadway information collection application can upload a desired road list that indicates the roadways (and/or regions of the roadways, such as lanes; see FIG. 5) in which the vehicle desires information.

In one embodiment, this desired road list can either define geographical regions in which the vehicle is to obtain data using the roadway information collection application and/or, in other embodiments, the desired road list can be sub-regions within a geographical region, each of which identify a sub-region in which the vehicle is to obtain data using the roadway information collection application. In step 542, the roadway information collection application is enabled to obtain information on the desired roads and to not obtain information on the non-desired roads. This step can include configuring vehicle feature data in conjunction with corresponding geographical region or boundary data, which can be defined by a plurality of geographical coordinates and which can then be sent to the vehicle 12. In step 544, the roadway information collection application can be carried out such that information is obtained concerning the roadways surrounding the vehicle or on which the vehicle is travelling. This can include using a front-facing camera, such as camera 40, and/or use of other vehicle sensors, including radar, lidar, sonar, and/or other light sensing devices. When the vehicle exits the geographical region that is associated with vehicle feature data indicating that the roadway information collection application is enabled and/or enters a region where the roadway information collection application is not enabled or disabled, then the roadway information collection application can sleep (e.g., enters a low power mode). The roadway information that is collected using the roadway information collection application can then be sent to the remote server facility 80, which can then process and incorporate the new data into various applications and databases, such as one or more databases holding the master geographical vehicle feature map. The method 500 then ends.

In one embodiment, the method 300, the method 400, the method 500, or parts thereof can be implemented in a computer program (or "application", such as the map-based vehicle feature enablement application discussed above) embodied in a computer readable medium and including instructions usable by one or more processors of one or more computers of one or more systems. The computer program may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media (such as memory 38, memory in BCM 24, memory of an infotainment unit or other onboard computer 42, and/or memory of servers 82), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method(s).

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

The invention claimed is:

1. A method of disabling autonomous or semi-autonomous vehicle features based on vehicle location, wherein the method comprises:
   receiving a localized geographical vehicle feature map at the vehicle from a remote server, wherein the localized geographical vehicle feature map includes geographical vehicle feature map data, wherein the geographical vehicle feature map data includes geographical regions associated with vehicle feature data that indicates whether one or more vehicle features are enabled and/or disabled, and wherein association of a particular geographical region with particular vehicle feature data indicates that the one or more vehicle features indicated by the particular vehicle feature data are enabled and/or disabled for the particular geographical region;
   monitoring vehicle location using a global navigation satellite system (GNSS) receiver included in the vehicle that is configured to receive a plurality of GNSS signals from a constellation of GNSS satellites;
   based on the monitoring of the vehicle location, determining that the vehicle is located within or approaching the particular geographical region of the geographical regions included in the localized geographical vehicle feature map;
   determining at least one autonomous or semi-autonomous vehicle feature associated with the particular geographical region based on accessing the localized geographical vehicle feature map, wherein the at least one autonomous or semi-autonomous vehicle feature concerns autonomous or semi-autonomous vehicle propulsion and/or steering;
   disabling the at least one autonomous or semi-autonomous vehicle feature based on information contained within the localized geographical vehicle feature map, including altering performance of a vehicle function of the autonomous or semi-autonomous vehicle feature that is presently being carried out by the vehicle; and
   prior to disabling the at least one vehicle feature, providing a vehicle operator notification of the disabling of the at least one vehicle feature, thereby providing the vehicle operator time to prepare to take over vehicle propulsion and/or steering control before the altering of the performance of the vehicle function of the autonomous or semi-autonomous vehicle feature is carried out by the vehicle.

2. The method of claim 1, wherein the geographical regions are each defined by one or more geographical coordinate pairs.

3. The method of claim 1, wherein the remote server is configured to store a master geographical vehicle feature map, to update the master geographical vehicle feature map, and to send the updates to the vehicle when the updates correspond to the geographical regions included in the localized geographical vehicle feature map.

4. The method of claim 1, further comprising:
   determining the vehicle has left the particular geographical region; and
   establishing a vehicle feature buffer of the at least one autonomous or semi-autonomous vehicle feature, wherein the vehicle feature buffer continues disablement of the at least one autonomous or semi-autonomous vehicle feature until the vehicle is outside the particular geographical region for one of a vehicle buffer distance or a vehicle buffer time.

5. The method of claim 1, further comprising the steps of:
   receiving real-time updates of the localized geographical vehicle feature map at the vehicle from the remote server, and updating the vehicle feature data of at least some of the geographical vehicle feature map data based on the real-time updates.

6. The method of claim 5, further comprising the step of requesting the real-time updates from the remote server through periodically sending a location associated with the vehicle to the remote server.

7. The method of claim 1, wherein the at least one vehicle feature pertains to a roadway information collection feature that can be used to collect information concerning a roadway or area surrounding the vehicle and to send the collected information to the remote server or another remote server.

8. The method of claim 7, wherein the roadway information collection feature includes using a vehicle camera mapping technology that, when enabled, causes the vehicle to capture images of the roadway on which the vehicle is travelling and, then, send the captured images or data based on the captured images to the remote server or the another remote server.

9. The method of claim 1, wherein the at least one vehicle feature includes an incentivized vehicle operation that credits a vehicle operator or account holder upon completion of the incentivized operation.

10. The method of claim 9, wherein the incentivized operation includes driving the vehicle in a particular lane along the roadway and/or driving the vehicle along a particular route.

11. A method of disabling autonomous or semi-autonomous vehicle features based on vehicle location, wherein the method comprises:
    maintaining a master geographical vehicle feature map that includes vehicle feature data associated with geographical regions, wherein the vehicle feature data includes information indicating whether one or more autonomous or semi-autonomous vehicle features are disabled for a given geographical region that the vehicle feature data is associated with, wherein the one or more autonomous or semi-autonomous vehicle features concerns autonomous or semi-autonomous vehicle propulsion and/or steering;
    receiving an indication of an update to geographical roadway data and/or vehicle feature availability to disable the one or more autonomous or semi-autonomous vehicle features in the given geographical region;
    updating the master geographical vehicle feature map based on updated geographical roadway data and/or vehicle feature availability information;
    sending localized geographical vehicle feature map information to a vehicle after the updating step;
    disabling the one or more autonomous or semi-autonomous vehicle features based on the received localized geographical vehicle feature map information, including altering performance of a vehicle function of the autonomous or semi-autonomous vehicle feature that is presently being carried out by the vehicle; and
    prior to disabling the at least one vehicle feature, providing a vehicle operator notification of the disabling of the at least one vehicle feature, thereby providing the vehicle operator time to prepare to take over vehicle propulsion and/or steering control before the altering of the performance of the vehicle function of the autonomous or semi-autonomous vehicle feature is carried out by the vehicle.

12. The method of claim 11, further comprising the steps of:
    receiving a localized geographical vehicle feature map request from a vehicle, wherein the localized geographical vehicle feature map request includes or otherwise indicates a vehicle location, wherein the vehicle location is the present location of the vehicle or a location that the vehicle is or intends to be in route towards; and
    sending a localized geographical vehicle feature map response to the vehicle in response to receiving the request, wherein the response includes information concerning the vehicle location.

13. The method of claim 11, wherein the master geographical vehicle feature map is comprised of geographical roadway information as well as the vehicle feature data that is associated with the geographical regions of the master geographical vehicle feature map.

14. The method of claim 11, further comprising the step of receiving roadway information from a plurality of vehicles, wherein at least some of the roadway information is used to update the master geographical vehicle feature map.

15. The method of claim 14, wherein the roadway information is collected pursuant to execution of a roadway information collection application using processing devices included as a part of each of the plurality of vehicles, wherein the roadway information collection application includes using a camera installed on each of the plurality of vehicles to collect information concerning the roadway on which the vehicle is travelling.

16. A vehicle electronics system, comprising:
    a global navigation satellite system (GNSS) receiver, wherein the GNSS receiver is configured to receive a plurality of GNSS signals from a constellation of GNSS satellites;
    a wireless communications device that includes a cellular chipset; and
    at least one additional vehicle system module (VSM) that is communicatively coupled to the wireless communications device;
    wherein the vehicle electronics system includes a processor and memory, wherein the memory includes a map-based vehicle feature enablement application, that, when executed by the processor, causes the vehicle electronics system to:
        receive a localized geographical vehicle feature map at the vehicle from a remote server using the cellular chipset, wherein the localized geographical vehicle feature map includes geographical vehicle feature map data, wherein the geographical vehicle feature map data includes geographical regions associated with vehicle feature data that indicates whether one or more vehicle features are enabled and/or disabled, and wherein association of a particular geographical region with particular vehicle feature data indicates that the one or more vehicle features indicated by the particular vehicle feature data are enabled and/or disabled for the particular geographical region;
        monitor vehicle location using the global navigation satellite system (GNSS) receiver included in the vehicle;
        based on the monitoring of the vehicle location, determine that the vehicle is located within or approaching the particular geographical region of the geographical regions included in the localized geographical vehicle feature map;

determine at least one autonomous or semi-autonomous vehicle feature associated with the particular geographical region based on accessing the localized geographical vehicle feature map, wherein the at least one vehicle feature is associated with the at least one additional VSM, wherein the at least one autonomous or semi-autonomous vehicle feature concerns autonomous or semi-autonomous vehicle propulsion and/or steering; and disable the at least one autonomous or semi-autonomous vehicle feature based on information contained within the localized geographical vehicle feature map, including altering performance of a vehicle function of the autonomous or semi-autonomous vehicle feature that is presently being carried out by the vehicle; and prior to disabling the at least one vehicle feature, provide a vehicle operator notification of the disabling of the at least one vehicle feature, thereby providing the vehicle operator time to prepare to take over vehicle propulsion and/or steering control before the altering of the performance of the vehicle function of the autonomous or semi-autonomous vehicle feature is carried out by the vehicle.

17. The vehicle electronics system of claim 16, further comprising a camera that is configured to capture images when a roadway information collection feature is enabled.

18. The vehicle electronics system of claim 16, wherein the map-based vehicle feature enablement application, when executed, further causes the vehicle electronics system to generate an enable or disable vehicle feature message and to send the enable or disable vehicle feature message to the at least one additional VSM via a communications bus included as a part of the vehicle electronics system.

* * * * *